United States Patent
Hong et al.

(10) Patent No.: US 11,435,149 B2
(45) Date of Patent: Sep. 6, 2022

(54) HEAT EXCHANGER AND HOUSEHOLD APPLIANCE

(71) Applicants: GD MIDEA HEATING & VENTILATING EQUIPMENT CO., LTD., Foshan (CN); MIDEA GROUP CO., LTD., Foshan (CN)

(72) Inventors: Zhirong Hong, Foshan (CN); Ming Song, Foshan (CN); Yiyang Mo, Foshan (CN); Yuzhao Zhang, Foshan (CN); Fudang Wei, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 117 days.

(21) Appl. No.: 16/617,652

(22) PCT Filed: Jan. 8, 2018

(86) PCT No.: PCT/CN2018/071727
§ 371 (c)(1),
(2) Date: Nov. 27, 2019

(87) PCT Pub. No.: WO2019/024437
PCT Pub. Date: Feb. 7, 2019

(65) Prior Publication Data
US 2020/0141670 A1 May 7, 2020

(30) Foreign Application Priority Data

Jul. 31, 2017 (CN) .......................... 201710642747.0
Jul. 31, 2017 (CN) .......................... 201720947515.1

(51) Int. Cl.
*F28F 21/00* (2006.01)
*F28F 21/08* (2006.01)
(Continued)

(52) U.S. Cl.
CPC ............ *F28F 21/084* (2013.01); *F25B 39/00* (2013.01); *B23K 1/0012* (2013.01);
(Continued)

(58) Field of Classification Search
CPC ...... F28F 21/084; F28F 1/126; F28F 2275/04; F25B 39/00; B23K 2103/10;
(Continued)

(56) References Cited

U.S. PATENT DOCUMENTS

2005/0006073 A1* 1/2005 Demuth ................ F28D 1/0478
165/150
2016/0298914 A1* 10/2016 Kanno ..................... B23K 1/19
2017/0260612 A1* 9/2017 Janssen ................ F28D 1/0233

FOREIGN PATENT DOCUMENTS

CN 101033926 A 9/2007
CN 102798252 A 11/2012
(Continued)

OTHER PUBLICATIONS

First Chinese Office Action dated Feb. 22, 2019 for Chinese Patent Application 201710642747.0.
(Continued)

*Primary Examiner* — Harry E Arant
(74) *Attorney, Agent, or Firm* — Dilworth & Barrese, LLP.; Michael J. Musella, Esq.

(57) ABSTRACT

A heat exchanger, includes a heat exchange pipe unit and a fin unit, the heat exchange pipe unit includes a refrigerant input pipe, a heat exchange pipe assembly and a refrigerant output pipe; the refrigerant input pipe is connected to one end of the heat exchange pipe assembly; the refrigerant output pipe is connected to the other end of the heat exchange pipe assembly; the fin unit is fixedly arranged outside of the heat exchange pipe assembly; the heat exchange pipe assembly and the fin unit are made of (Continued)

aluminum alloy; and the corrosion potential of the aluminum alloy which forms at least a part of the heat exchange pipe assembly is greater than the corrosion potential of the aluminum alloy which forms the remaining part of the heat exchange pipe assembly.

19 Claims, 2 Drawing Sheets

(51) Int. Cl.
*F25B 39/00* (2006.01)
*B23K 103/10* (2006.01)
*B23K 101/14* (2006.01)
*B23K 1/00* (2006.01)
*B23P 15/26* (2006.01)
*C22C 21/00* (2006.01)
*F28F 1/12* (2006.01)

(52) U.S. Cl.
CPC ...... *B23K 2101/14* (2018.08); *B23K 2103/10* (2018.08); *B23P 15/26* (2013.01); *C22C 21/00* (2013.01); *F28F 1/126* (2013.01); *F28F 2275/04* (2013.01)

(58) Field of Classification Search
CPC ........ B23K 2103/2101; B23K 2101/14; B23K 1/0012; B23P 15/26; C22C 21/00
See application file for complete search history.

(56) References Cited

FOREIGN PATENT DOCUMENTS

| | | | |
|---|---|---|---|
| CN | 106524332 A | | 3/2017 |
| CN | 107270589 A | | 10/2017 |
| CN | 207163023 U | | 3/2018 |
| JP | 2017053547 A | * | 3/2017 |
| JP | 2017053547 A | | 3/2017 |
| KR | 20000067795 A | | 11/2000 |
| KR | 100335679 B1 | | 5/2002 |

OTHER PUBLICATIONS

Second Chinese Office Action dated Jul. 25, 2019 for Chinese Patent Application 201710642747.0.
Third Chinese Office Action dated Nov. 13, 2019 for Chinese Patent Application 201710642747.0.
International Search Report and Written Opinion dated May 7, 2018 from State Intellectual Property Office of the P.R. China.

* cited by examiner

HEAT EXCHANGER AND HOUSEHOLD APPLIANCE

PRIORITY INFORMATION

The present disclosure is a national stage filing of international application PCT/CN2018/071727, filed on Jan. 8, 2018, claims the priorities and benefits of Chinese Patent Applications, an invention and a utility model, No. 201710642747.0 and 201720947515.1, filed to National Intellectual Property Administration of China on Jul. 31, 2017, each of which are incorporated herein by reference in its entirety.

FIELD

The present disclosure relates to the field of household electrical appliance manufacturing, in particular to a heat exchanger and household electrical appliance.

BACKGROUND

With the constant price rise of the raw material copper and the fact that a copper tube fin heat exchanger cannot avoid the ant corrosion problem, all-aluminum heat exchangers are gradually popularized. Furthermore, with the development of science and technology, the manufacturing process of an aluminum tube heat exchanger is becoming perfect. At present, the aluminum tube heat exchanger, as an economical, light and efficient heat exchange device, has been widely used in a lot of fields.

However, the present heat exchanger and household electrical appliance still need to be improved.

SUMMARY

The present disclosure is established on the basis of the discovery and understanding of the inventor for the following facts and problems:

At present, an all-aluminum heat exchanger generally has the problem of short service life. The inventor finds out through deep research and a large number of experiments that the problem is caused mainly because the all-aluminum heat exchanger is easy to be electrochemically corroded. Compared with the materials such as copper and the like, aluminum alloy is more active, and is easy to be electrochemically corroded in use. Especially for the all-aluminum heat exchanger, the entire heat exchanger is made from an active material. If a core component is electrochemically corroded, then the all-aluminum heat exchanger would be out of service and the service life of the all-aluminum heat exchanger would be short.

One object of the present disclosure is to invent an all-aluminum heat exchanger capable of protecting the aluminum tube of the all-aluminum heat exchanger under the situation that electrochemical corrosion occurs.

The object of the present disclosure is to, at least to a certain extent, mitigate or solve at least one of the above-mentioned problems.

In one aspect of the present disclosure, the present disclosure provides a heat exchanger. The heat exchanger includes a heat exchange tube unit and a fin unit, wherein the heat exchange tube unit includes a refrigerant input tube, a heat exchange tube assembly and a refrigerant output tube; the refrigerant input tube is connected to one end of the heat exchange tube assembly; the refrigerant output tube is connected to the other end of the heat exchange tube assembly; the fin unit is fixedly disposed outside the heat exchange tube assembly; the heat exchange tube unit and the fin unit each are made from an aluminum alloy; and a corrosion potential of the aluminum alloy forming at least a part of the heat exchange tube assembly is higher than a corrosion potential of the aluminum alloy forming the other parts of the heat exchange tube assembly. Therefore, the service life of the all-aluminum heat exchanger can be improved without increasing cost.

According to an embodiment of the present disclosure, the heat exchange tube assembly includes a plurality of U-shaped tubes and a plurality of semi-circular tubes; and the plurality of U-shaped tubes are connected via respective semi-circular tubes. Therefore, the plurality of U-shaped tubes can be connected and fixed.

According to an embodiment of the present disclosure, a thickness of a tube wall of the U-shaped tube is less than a thickness of a tube wall of the semi-circular tube. Therefore, a flow resistance of the refrigerant can be reduced, and a heat exchange performance of the heat exchanger can be improved.

According to an embodiment of the present disclosure, a corrosion potential of the aluminum alloy forming the U-shaped tube is higher than a corrosion potential of the aluminum alloy forming the semi-circular tube. Therefore, the semi-circular tube can be corroded prior to the U-shaped tube, thus improving the service life of the heat exchanger.

According to an embodiment of the present disclosure, the corrosion potential of the aluminum alloy forming the U-shaped tube is more than 10 mV higher than the corrosion potential of the aluminum alloy forming the semi-circular tube. Therefore, the service life of the heat exchanger can be further improved.

According to an embodiment of the present disclosure, the corrosion potential of the U-shaped tube is $-724\pm6$ mV, and the corrosion potential of the semi-circular tube is $-765\pm39$ mV or $-733\pm4$ mV or $-756\pm28$ mV or $-735\pm5$ mV or $-813\pm18$ mV. Therefore, the corrosion potential of the U-shaped tube is higher than the corrosion potential of the semi-circular tube, such that the semi-circular tube can be corroded prior to the U-shaped tube, thus protecting the U-shaped tube, and improving the service life of the heat exchanger.

According to an embodiment of the present disclosure, a thickness of a tube wall of the semi-circular tube is equal to a thickness of a tube wall of the U-shaped tube. Therefore, the thickness of the tube wall of the semi-circular tube can be configured as thin as the thickness of the tube wall of the U-shaped tube, such that the flow resistance of the refrigerant can be further reduced, and the heat exchange performance of the heat exchanger can be further improved.

According to an embodiment of the present disclosure, the corrosion potential of the aluminum alloy forming the semi-circular tube is equal to the corrosion potential of the aluminum alloy forming the U-shaped tube. Therefore, the U-shaped tube and the semi-circular tube can be both protected, thus improving the service life of the heat exchanger.

According to an embodiment of the present disclosure, the corrosion potential of the aluminum alloy forming the U-shaped tube, and the corrosion potential of the aluminum alloy forming the semi-circular tube are higher than the corrosion potential of the aluminum alloy forming the other parts of the heat exchange tube assembly. Therefore, the other parts of the heat exchange tube assembly can be corroded prior to the U-shaped tube and the semi-circular tube, such that the U-shaped tube and the semi-circular tube are protected.

According to an embodiment of the present disclosure, the corrosion potentials of the U-shaped tube and the semi-circular tube are both −724±6 mV, and the corrosion potential of the other parts of the heat exchange tube assembly is −765±39 mV or −733±4 mV or −756±28 mV or −735±5 mV or −813±18 mV. Therefore, the corrosion potentials of the U-shaped tube and the semi-circular tube are higher than the corrosion potential of the other parts of the heat exchange tube assembly, such that the other parts of the heat exchange tube assembly can be corroded prior to the U-shaped tube and the semi-circular tube, thus protecting the U-shaped tube and the semi-circular tube, and improving the service life of the heat exchanger.

According to an embodiment of the present disclosure, the fin unit includes a heat exchange fin; the U-shaped tube includes two linear portions and a bending portion; and the bending portion connects the two linear portions. Therefore, the heat exchange fin and the U-shaped tube can be utilized to realize the heat exchange of the heat exchanger.

According to an embodiment of the present disclosure, the heat exchange fin is disposed corresponding to the linear portions of the U-shaped tube. Therefore, the heat exchange effect of the heat exchanger can be guaranteed.

According to an embodiment of the present disclosure, the heat exchange tube assembly penetrates through the fin unit. Therefore, the heat exchange effect of the heat exchanger can be further guaranteed.

According to an embodiment of the present disclosure, the heat exchange tube assembly includes a plurality of flat tubes arranged in parallel. Therefore, the heat exchange effect of the parallel flow all-aluminum heat exchanger can be guaranteed.

According to an embodiment of the present disclosure, a corrosion potential of an aluminum alloy forming the flat tube is higher than a corrosion potential of the aluminum alloy forming the fin unit. Therefore, the fin can be corroded prior to the flat tube, thus improving the service life of the parallel flow all-aluminum heat exchanger.

According to an embodiment of the present disclosure, the refrigerant input tube is connected to first ends of the plurality of flat tubes; and the refrigerant output tube is connected to second ends of the plurality of flat tubes. Therefore, the flat tube can be connected and fixed.

According to an embodiment of the present disclosure, the corrosion potential of the aluminum alloy forming the flat tube is higher than a corrosion potential of the aluminum alloys forming the refrigerant input tube and the refrigerant output tube. Therefore, the refrigerant input tube and the refrigerant output tube can be corroded prior to the flat tube, thus improving the service life of the parallel flow all-aluminum heat exchanger.

According to an embodiment of the present disclosure, the corrosion potential of the aluminum alloy forming the flat tube is more than 10 mV higher than the corrosion potentials of the aluminum alloys forming the refrigerant input tube and/or the refrigerant output tube. Therefore, the service life of the parallel flow all-aluminum heat exchanger can be further improved.

According to an embodiment of the present disclosure, the fin unit includes a heat exchange fin, wherein the heat exchange fin is disposed corresponding to the flat tube. Therefore, the heat exchange effect of the heat exchanger can be guaranteed.

According to an embodiment of the present disclosure, the heat exchange tube assembly and the fin unit are arranged in parallel. Therefore, the heat exchange effect of the parallel flow heat exchanger can be further guaranteed.

According to an embodiment of the present disclosure, the heat exchanger includes a tube-fin heat exchanger and a parallel flow heat exchanger. Therefore, the tube-fin heat exchanger and the parallel flow heat exchanger may have long service lives.

In another aspect of the present disclosure, the present disclosure provides a household electrical appliance. According to an embodiment of the present disclosure, the household electrical appliance includes the above-described heat exchanger. Therefore, the service life of the household electrical appliance can be improved.

According to an embodiment of the present disclosure, the household electrical appliance includes a household air conditioner. Therefore, the service life of the air conditioner can be improved.

Figure 1:
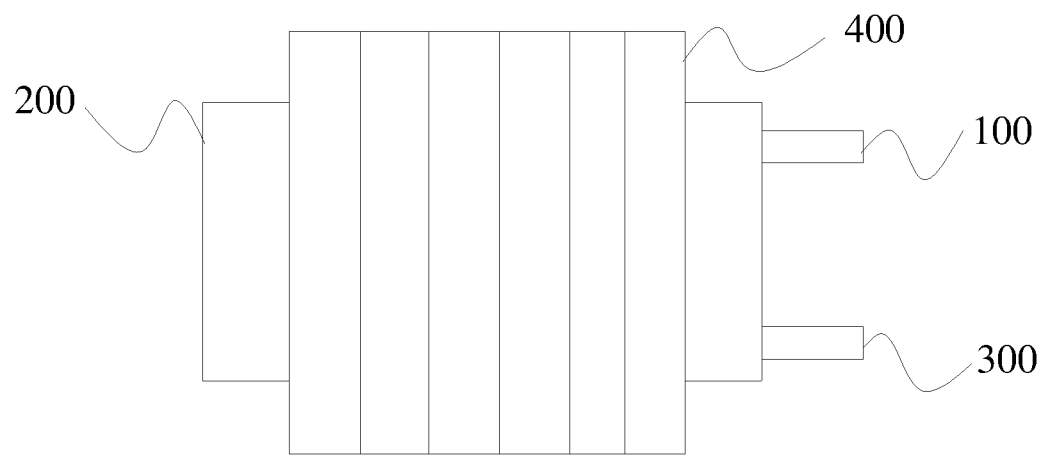
FIG. 1 depicts a structural schematic view of the heat exchanger according to one embodiment of the present disclosure.

DESCRIPTION OF REFERENCE SIGNS 100, refrigerant input tube; 200, heat exchange tube assembly; 210, U-shaped tube; 220, semi-circular tube; 230, flat tube; 211, linear portion; 212, bending portion; 300, refrigerant output tube; 400, fin assembly; 500, flow collection tube.

DETAILED DESCRIPTION

The embodiments of the present disclosure will be described in detail hereafter, and the examples of the embodiments are shown in the drawings. The embodiments described below with reference to the drawings are for illustration only, and are intended to explain the present disclosure, but not to limit the present disclosure.

In one aspect of the present disclosure, the present disclosure provides a heat exchanger. According to an embodiment of the present disclosure, with reference to FIG. 1, the heat exchanger includes a heat exchange tube unit and a fin unit 400, wherein the heat exchange tube unit includes a refrigerant input tube 100, a heat exchange tube assembly 200 and a refrigerant output tube 300; the refrigerant input tube 100 is connected to one end of the heat exchange tube assembly 200; the refrigerant output tube 300 is connected to the other end of the heat exchange tube assembly 200; and the fin unit 400 is fixedly disposed outside the heat exchange tube assembly 200. Furthermore, the heat exchange tube unit 200 and the fin unit 400 each are made from an aluminum alloy; and a corrosion potential of the aluminum alloy forming at least a part of the heat exchange tube assembly 200 is higher than a corrosion potential of the aluminum alloy forming the other parts of the heat exchange tube assembly 200. Therefore, the service life of the all-aluminum heat exchanger can be improved without increasing cost.

In order to facilitate understanding, the principle how the service life of the heat exchanger is improved will be simply introduced hereafter:

As described above, an all-aluminum heat exchanger is easy to be electrochemically corroded, and thus has a short service life. Specifically, the thickness of a heat exchange tube of the all-aluminum heat exchanger is generally very thin because a too thick wall would reduce the inner diameter of the heat exchange tube, increase the flow resistance of the refrigerant, and reduce the heat exchange performance of the heat exchanger. Therefore, the heat exchange tube with a very thin thickness will be first corroded, thus the all-aluminum heat exchanger would be out of service. According to an embodiment of the present disclosure, different components of the all-aluminum heat exchanger adopt the materials with different corrosion potentials, so as to achieve the purpose of protecting a thin component, thus improving the corrosion life of the all-aluminum heat exchanger. According to an electrochemical reaction principle, when two metals with different corrosion potentials contact and are electrochemically corroded, the metal with lower corrosion potential will be first corroded. Therefore, in the present disclosure, a thinnest component of the all-aluminum heat exchanger adopts an aluminum alloy with a higher corrosion potential, and the other components adopt aluminum alloys with lower corrosion potentials, such that the thinnest component can be protected, and the all-aluminum heat exchanger can be protected under the situation that electrochemical corrosion occurs, thus improving the service life thereof.

The structure of the heat exchanger will be described in detail hereafter according to specific embodiment of the present disclosure:

According to an embodiment of the present disclosure, the specific type of the heat exchanger is not specially limited. For example, with reference to FIGS. 2 and 3, the heat exchanger may be a tube-fin heat exchanger; the heat exchange tube assembly 200 may include a plurality of U-shaped tubes 210 and a plurality of semi-circular tubes 220, Wherein the U-shaped tube 210 includes two linear portions 211 and a bending portion 212; and the plurality of U-shaped tubes 210 are connected via the semi-circular tubes 220. Specifically, the adjacent linear portions 211 of two adjacent U-shaped tubes 210 are connected via the semi-circular tube 220. Therefore, the plurality of U-shaped tubes can be connected. According to an embodiment of the present disclosure, in order to reduce the flow resistance of the refrigerant and improve the heat exchange performance of the heat exchanger, the thickness of the tube wall of the U-shaped tube 210 is made very thin, thus ensuring the heat exchange performance of the heat exchanger. In addition, an inner wall of the semi-circular tube 220 is a smooth surface, and an inner wall of the U-shaped tube 210 is a spiral surface. Therefore, the resistance action of the semi-circular tube 220 to the refrigerant is less than the resistance action of the U-shaped tube 210 to the refrigerant. Therefore, according to an embodiment of the present disclosure, the thickness of the tube wall of the U-shaped tube 210 can be less than the thickness of the tube wall of the semi-circular tube 220. Therefore, the inventor finds that the U-shaped tube 210 is the thin component of the all-aluminum heat exchanger. Therefore, according to an embodiment of the present disclosure, an aluminum alloy with a higher corrosion potential is adopted as the material of the U-shaped tube 210. According to a specific embodiment of the present disclosure, the corrosion potential of the aluminum alloy forming the U-shaped tube 210 is higher than the corrosion potential of the aluminum alloy forming the semi-circular tube 220. Specifically, the corrosion potential of the aluminum alloy forming the U-shaped tube 210 is more than 10 mV higher than the corrosion potential of the aluminum alloy forming the semi-circular tube 220. Therefore, the semi-circular tube can be corroded first, thus improving the service life of the heat exchanger. According to other embodiments of the present disclosure, after the refrigerant passes through the U-shaped tube 210, the refrigerant would enter the semi-circular tube 220 connected to the U-shaped tube 210. Therefore, the thickness of the tube wall of the semi-circular tube 220 can be configured as thin as the thickness of the tube wall of the U-shaped tube 210, such that the flow resistance of the refrigerant can be further reduced, and the heat exchange performance of the heat exchanger can be further improved. Furthermore, the semi-circular tube 220 and the U-shaped tube 210 are made from the same aluminum alloy with a higher corrosion potential. That is, the corrosion potential of the aluminum alloy forming the semi-circular tube 220 is the same as the corrosion potential of the aluminum alloy forming the U-shaped tube 210; and the corrosion potential of the aluminum alloys forming the two is higher than the corrosion potentials of the aluminum alloys forming the other components of the heat exchanger. It should be noted that since the tube wall of the semi-circular tube 220 is designed very thin, the occurrence of an over-burning phenomenon should be avoided.

According to an embodiment of the present disclosure, the fin unit 400 may include a heat exchange fin, wherein the heat exchange fin is disposed corresponding to the linear portion 211 of the U-shaped tube 210. The specific position relationship between the fin unit and the heat exchange tube assembly is not specially limited, and can be designed by a person skilled in the art according to a practical situation. According to some embodiments of the present disclosure, with reference to FIG. 2, the heat exchange tube assembly 200 can penetrate through the fin unit 400. It should be noted that the fin unit 400 according to an embodiment of the present disclosure may further include an aluminum alloy side plate (not shown in the figure). Therefore, the heat exchange fin can be fixed. According to other embodiments of the present disclosure, the heat exchanger can also be a parallel flow heat exchanger. Specifically, with reference to FIG. 4, the fin unit 400 can also be arranged in parallel with the heat exchange tube assembly 200.

Figure 2:
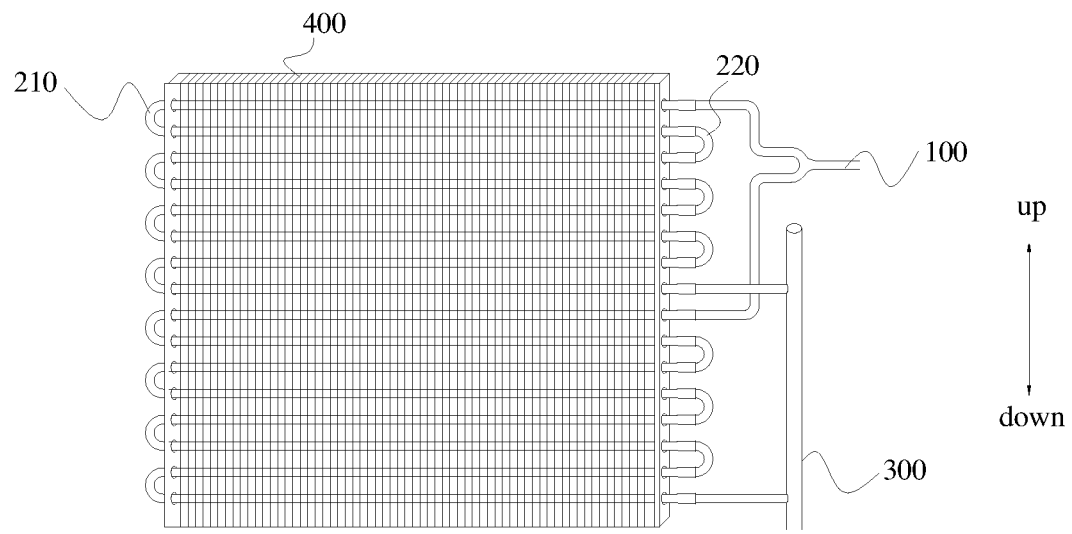
FIG. 2 depicts a structural schematic view of the heat exchanger according to another embodiment of the present disclosure.
Figure 3:
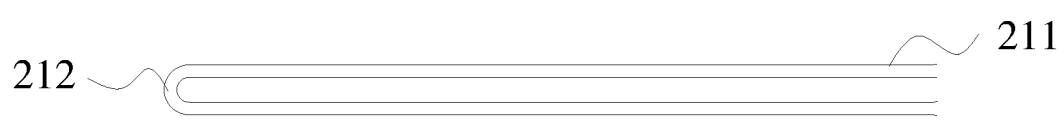
FIG. 3 depicts a structural schematic view of the heat exchange tube assembly according to one embodiment of the present disclosure.

According to an embodiment of the present disclosure, with reference to FIG. 2, the heat exchanger may include a plurality of heat exchange tube units; the plurality of U-shaped tubes 210 of each heat exchange tube unit are arranged from top to bottom; the refrigerant input tube 100 is connected to an upper linear portion 211 of the topmost U-shaped tube 210; the plurality of semi-circular tubes 220 are sequentially connected to the adjacent linear portions 211 of two adjacent U-shaped tubes 210; and the refrigerant output tube 300 is connected to a lower linear portion 211 of the bottommost U-shaped tube 210. Therefore, the heat exchange performance of the heat exchanger can be realized. A person skilled in the art could understand that the wall thicknesses of the aluminum alloy side plate, the semi-circular tube 220, the refrigerant input tube 100 and the refrigerant output tube 300 are generally two to three times and even more that of the U-shaped tube 210. That is, the wall of the U-shaped tube 210 is the thinnest in the components of the all-aluminum heat exchanger, for example, about 0.5 mm. Therefore, according to other embodiments of the present disclosure, the corrosion potential of the aluminum alloy forming the U-shaped tube 210 is higher than the corrosion potentials of the aluminum alloys forming the aluminum alloy side plate, the semi-circular tube 220, the refrigerant input tube 100 and the refrigerant output tube 300, thus further improving the service life of the heat exchanger. Specifically, the U-shaped tube 210 in the present disclosure can select an aluminum alloy with a higher corrosion potential, for example, the 9158 aluminum alloy (the corrosion potential is −745±5 mV). And the aluminum alloy side plate, the semi-circular tube 220, the refrigerant input tube 100 and the refrigerant output tube 300 having thicker walls select an aluminum alloy with a lower corrosion potential, for example, the 3003 aluminum alloy (the corrosion potential is −770±5 mV). Furthermore, the heat exchange fin is not a part of a pressure bearing vessel of the heat exchangers, and thus can select an aluminum alloy with a lower corrosion potential, for example, the 3003 aluminum alloy. Alternatively, according to a specific embodiment of the present disclosure, the U-shaped tube 210 can select the 2219 aluminum alloy (corrosion potential is −724±6 mV), and the other components can select the 1100 aluminum alloy (corrosion potential is −765±39 mV), the 2024 aluminum alloy (corrosion potential is −733±4 mV), the 6061 aluminum alloy (corrosion potential is −756±28 mV), the 3103 aluminum alloy (corrosion potential is −735±5 mV) and the 7075 aluminum alloy (corrosion potential is −813±18 mV).

Figure 4:
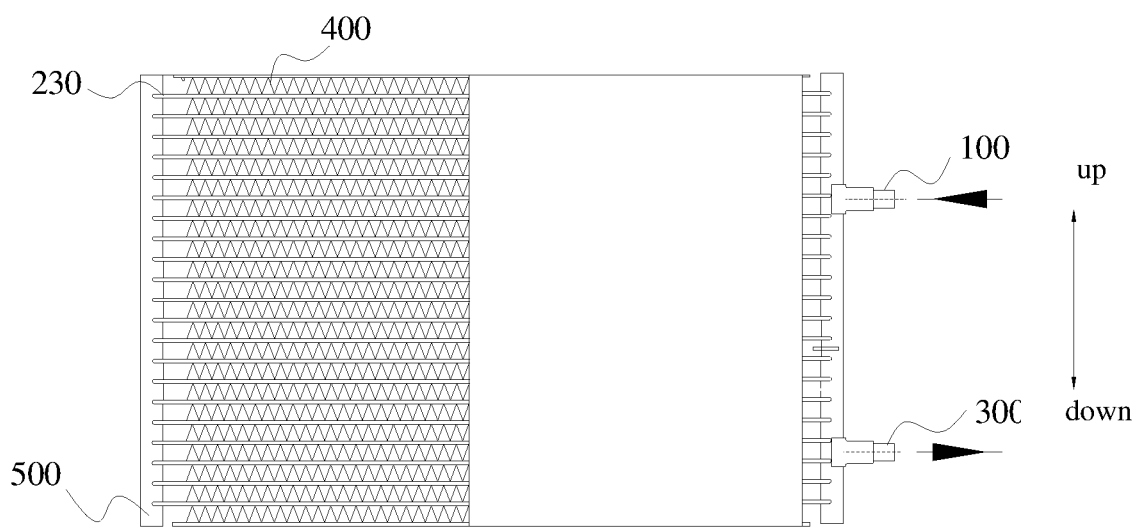
FIG. 4 depicts a structural schematic view of the heat exchanger according to one embodiment of the present disclosure.

According to an embodiment of the present disclosure, with reference to FIG. 4, the heat exchanger includes a refrigerant input tube 100, a refrigerant output tube 300, a heat exchange tube assembly 200, a fin unit 400 and a flow collection tube 500, wherein the heat exchange tube assembly 200 may further include a plurality of flat tubes 230 arranged in parallel. Therefore, the heat exchange performance of the parallel flow all-aluminum heat exchanger can be guaranteed. According to an embodiment of the present disclosure, in order to reduce the flow resistance of the refrigerant and improve the heat exchange performance of the heat exchanger, the thickness of the tube wall of the flat tube 230 is made very thin. That is, the flat tube 230 is the thinnest component of the parallel flow all-aluminum heat exchanger. Therefore, according to an embodiment of the present disclosure, an aluminum alloy with a higher corrosion potential is adopted to make the flat tube 230. According to a specific embodiment of the present disclosure, the corrosion potential of the aluminum alloy forming the flat tube 230 is higher than the corrosion potentials of the aluminum alloys forming the fin unit 400, the refrigerant input tube 100, the refrigerant output tube 300 and the flow collection tube 500. Specifically, the corrosion potential of the aluminum alloy forming the flat tube 230 is more than 10 mV higher than the corrosion potentials of the aluminum alloys forming the refrigerant input tube 100 and the refrigerant output tube 300. Therefore, the service life of the heat exchanger is further improved.

According to an embodiment of the present disclosure, the heat exchange fin is disposed corresponding to the flat tube 230. Specifically, the heat exchange fin can be disposed in parallel with the flat tube 230. According to an embodiment of the present disclosure, the refrigerant input tube 100 is connected to first ends of the plurality of flat tubes 230; the refrigerant output tube 300 is connected to second ends of the plurality of flat tubes 230; the refrigerant enters the upper flat tube 230 via the refrigerant input tube 100, then enters the lower flat tube 230 via the flow collection tube 500, and is finally output via the refrigerant output tube 300, thus realizing a heat exchange process of the heat exchanger.

In summary, in the present disclosure, different components of the all-aluminum heat exchanger select different aluminum alloy materials; the thinnest component selects the aluminum alloy with a higher corrosion potential, and the other components with a higher safety margin select the aluminum alloy with a lower corrosion potential. Therefore, the components with a lower corrosion potential will be first corroded when electrochemical corrosion occurs, thus having a protection effect on the thin component of the all-aluminum heat exchanger. Compared to the operation of galvanizing a protective layer on the surface of the all-aluminum heat exchanger to improve a corrosion-proof life, the consumed cost of the present disclosure is lower. Therefore, the corrosion-proof life of the entire components of the all-aluminum heat exchanger is improved without increasing cost.

In another aspect of the present disclosure, the present disclosure provides a household electrical appliance. According to an embodiment of the present disclosure, the household electrical appliance includes the above-described heat exchanger. Therefore, the household electrical appliance may have all the features and advantages of the heat exchanger, which will not be repeated here. All in all, the service life of the household electrical appliance can be improved. According to a specific embodiment of the present disclosure, the household electrical appliance may include a household air conditioner. Therefore, the service life of the air conditioner can be improved.

In the description of the specification, the reference terms "an embodiment", "some embodiments", "example", "a specific example" or "some examples" and the like mean that the specific characteristic, structure, material or feature described in combination with the embodiment or the example are contained in at least one embodiment or example of the present disclosure. In the specification, the schematic recitation of the above-described terms does not necessarily refer to the same embodiment or example. Furthermore, the described specific characteristic, structure, material or feature can be combined in an appropriate manner in any one or more embodiments or examples. In addition, under the situation of having no conflict, a person skilled in the art can combine or incorporate different embodiments or examples described in the specification and the features of the different embodiments or examples.

Although the embodiments of the present disclosure have been shown and described hereabove, it can be understood that the above-described embodiments are only for illumination, but not intended to limit the present disclosure. And a person skilled in the art can make various changes, modifications, substitutions and variations to the above-described embodiments in the scope of the present disclosure.

What is claimed is:
1. A heat exchanger, comprising:
  a heat exchange tube unit, comprising a refrigerant input tube, a heat exchange tube assembly and a refrigerant output tube, wherein the refrigerant input tube is connected to one end of the heat exchange tube assembly; the refrigerant output tube is connected to the other end of the heat exchange tube assembly; and
  a fin unit, fixedly disposed outside the heat exchange tube assembly, wherein the heat exchange tube unit and the fin unit each are made from an aluminum alloy; and a corrosion potential of the aluminum alloy forming at least a part of the heat exchange tube assembly is greater than a corrosion potential of the aluminum alloy forming the other parts of the heat exchange tube assembly, wherein the heat exchange tube assembly comprises a plurality of U-shaped tubes and a plurality of semi-circular tubes; and the plurality of U-shaped tubes are connected via respective semi-circular tubes, and wherein, where a thickness of a tube wall of the plurality of U-shaped tube is less than a thickness of a tube wall of the plurality of semi-circular tube, a corrosion potential of the aluminum alloy forming the plurality of U-shaped tubes is greater than a corrosion potential of the aluminum alloy forming the plurality of semi-circular tubes.

2. The heat exchanger according to claim 1, wherein a corrosion potential of the aluminum alloy forming the plurality of U-shaped tube is more than 10 mV greater than a corrosion potential of the aluminum alloy forming the plurality of semi-circular tube.

3. The heat exchanger according to claim 2, wherein the corrosion potential of the plurality of U-shaped tube is −724±6 mV, and the corrosion potential of the plurality of semi-circular tube is −765±39 mV or −733±4 mV or −756±28 mV or −735±5 mV or −813±18 mV.

4. The heat exchanger according to claim 1, wherein a thickness of a tube wall of the plurality of semi-circular tube is equal to a thickness of a tube wall of the plurality of U-shaped tube.

5. The heat exchanger according to claim 4, wherein a corrosion potential of the aluminum alloy forming the plurality of semi-circular tube is equal to a corrosion potential of the aluminum alloy forming the plurality of U-shaped tube.

6. The heat exchanger according to claim 5, wherein the corrosion potential of the aluminum alloy forming the plurality of U-shaped tube, and the corrosion potential of the aluminum alloy forming the plurality of semi-circular tube are greater than the corrosion potential of the aluminum alloy forming the other parts of the heat exchange tube assembly.

7. The heat exchanger according to claim 6, wherein the corrosion potentials of the plurality of U-shaped tube and the plurality of semi-circular tube are both −724±6 mV, and the corrosion potential of the other parts of the heat exchange tube assembly is −765±39 mV or −733±4 mV or −756±28 mV or −735±5 mV or −813±18 mV.

8. The heat exchanger according to claim 1, wherein the fin unit comprises a heat exchange fin; the plurality of U-shaped tube comprises two linear portions and a bending portion; and the bending portion connects the two linear portions.

9. The heat exchanger according to claim 8, wherein the heat exchange fin is disposed corresponding to the linear portions of the plurality of U-shaped tube.

10. The heat exchanger according to claim 8, wherein the heat exchange tube assembly penetrates through the fin unit.

11. The heat exchanger according to claim 1, wherein the heat exchange tube assembly comprises a plurality of flat tubes arranged in parallel.

12. The heat exchanger according to claim 11, wherein a corrosion potential of an aluminum alloy forming the flat tube is greater than a corrosion potential of the aluminum alloy forming the fin unit.

13. The heat exchanger according to claim 11, wherein the refrigerant input tube is connected to first ends of the plurality of flat tubes; and the refrigerant output tube is connected to second ends of the plurality of flat tubes.

14. The heat exchanger according to claim 13, wherein a corrosion potential of an aluminum alloy forming the flat tube is higher than a corrosion potential of the aluminum alloys forming the refrigerant input tube and the refrigerant output tube.

15. The heat exchanger according to claim 13, wherein a corrosion potential of an aluminum alloy forming the flat tube is more than 10 mV greater than a corrosion potential of aluminum alloys forming the refrigerant input tube and/or the refrigerant output tube.

16. The heat exchanger according to claim 11, wherein the fin unit comprises a heat exchange fin, and the heat exchange fin is disposed corresponding to the flat tube.

17. The heat exchanger according to claim 16, wherein the heat exchange tube assembly and the fin unit are arranged in parallel.

18. The heat exchanger according to claim 1, wherein the heat exchanger comprises a tube-fin heat exchanger and a parallel flow heat exchanger.

19. A household electrical appliance, comprising the heat exchanger as claimed in claim 1.

* * * * *